(12) United States Patent
Ueno et al.

(10) Patent No.: US 8,737,026 B2
(45) Date of Patent: May 27, 2014

(54) ELECTRIC VEHICLE CHARGING CORD SET

(75) Inventors: Satoru Ueno, Osaka (JP); Youji Minami, Nagoya (JP); Tatsuya Mukai, Tsu (JP); Kiyoshi Goto, Amagasaki (JP); Shiro Mori, Tsu (JP); Hirotoshi Watanabe, Tsu (JP); Tomoyoshi Hayashi, Tsu (JP); Yutaka Takada, Tsu (JP); Hiroshi Ooya, Tsu (JP); Kouji Kakiuchi, Tsu (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 13/060,866

(22) PCT Filed: Aug. 21, 2009

(86) PCT No.: PCT/IB2009/006608
§ 371 (c)(1),
(2), (4) Date: Feb. 25, 2011

(87) PCT Pub. No.: WO2010/023527
PCT Pub. Date: Mar. 4, 2010

(65) Prior Publication Data
US 2011/0149455 A1    Jun. 23, 2011

(30) Foreign Application Priority Data

Aug. 26, 2008  (JP) .................................. 2008-217419
Oct. 28, 2008  (JP) .................................. 2008-277421

(51) Int. Cl.
*H02H 9/08*    (2006.01)
(52) U.S. Cl.
USPC .................... 361/42; 191/12.2 R; 191/12.4
(58) Field of Classification Search
USPC ................... 191/12.2 R, 12.4; 361/42
See application file for complete search history.

(56) References Cited

U.S. PATENT DOCUMENTS 5,855,262 A * 1/1999 Jackson ................... 191/12.4
6,035,983 A    3/2000 Benner
(Continued)

FOREIGN PATENT DOCUMENTS

CN  1367565       9/2002
DE  8436765 U1   3/1985
(Continued)

OTHER PUBLICATIONS

The Korean Office Action dated Mar. 5, 2012 and the English summary thereof.

(Continued)

*Primary Examiner* — Rexford Barnie
*Assistant Examiner* — Tien Mai
(74) *Attorney, Agent, or Firm* — Bacon & Thomas, PLLC

(57) ABSTRACT

An electric vehicle charging cord set includes a housing containing an interrupting device therein and a first cord provided at one end with a plug connectable to an outlet installed on a wall surface of a building and at the other end connected to one of the terminal units of the interrupting device. An electric vehicle charging cord set further includes a second cord provided at one end with a connector connectable to an inlet of an electric vehicle and at the other end connected to the other of the terminal units of the interrupting device. The housing includes a storage unit for extendibly storing the second cord, a stand for placing the housing on a ground surface and a transportation handle. The storage unit includes a drum rotatably attached to the housing. The second cord is wound on the outer circumferential surface of the drum.

10 Claims, 10 Drawing Sheets

(56) References Cited

U.S. PATENT DOCUMENTS

| | | | |
|---|---|---|---|
| 6,346,006 B1* | 2/2002 | Smith | 439/501 |
| 6,848,937 B1* | 2/2005 | Hsiao | 439/528 |
| 7,372,678 B2* | 5/2008 | DiSalvo et al. | 361/42 |
| 7,419,038 B2* | 9/2008 | Caamano et al. | 191/12.2 R |
| 2007/0006603 A1* | 1/2007 | Reusche et al. | 62/196.4 |

FOREIGN PATENT DOCUMENTS

| | | |
|---|---|---|
| JP | H05328619 | 12/1993 |
| JP | 833121 | 2/1996 |
| JP | H10080071 | 3/1998 |
| JP | H11122714 | 4/1999 |
| JP | 2001130838 | 5/2001 |
| JP | 2002051476 | 2/2002 |
| KR | 200314386 | 5/2003 |

OTHER PUBLICATIONS

The Chinese Office Action dated Feb. 16, 2013 and the English translation thereof.

* cited by examiner

ELECTRIC VEHICLE CHARGING CORD SET

FIELD OF THE INVENTION

The present invention relates to an electric vehicle charging cord set for use in charging a battery of an electric vehicle.

BACKGROUND OF THE INVENTION

In recent years, there is provided an electric vehicle equipped with a battery (or a secondary battery) and an electric motor. The battery needs to be charged in this kind of electric vehicle, for the reason of which various kinds of charging devices have been proposed in the art (see, e.g., Japanese Patent Laid-open Publication No. 8-33121).

The charging device disclosed in Japanese Patent Laid-open Publication No. 8-33121 includes: an operation box connected to a service wire of a commercial single-phase power source of 200 V in voltage through a time-based meter, a cabinet panel and a power supply cable; a charging cable connected to the power supply cable through the operation box; an AC/DC converter provided on a charging line that interconnects a battery mounted to an electric vehicle and a vehicle-side connector (or an inlet) attached to a vehicle body; a charging connector connected to the tip end of the charging cable and connectable to the vehicle-side connector; and a charging cable container for storing the charging cable therein.

Since the charging device disclosed in Japanese Patent Laid-open Publication No. 8-33121 is installed in a garage, it is costly to install the same in place. Furthermore, this charging device is unable to meet the demand of a user who wishes to charge an electric vehicle at an out-of-garage location. Taking this into account, there has been proposed an electric vehicle charging cord set 100 as illustrated in FIG. 9, which cord set allows a user to charge an electric vehicle with ease.

The electric vehicle charging cord set 100 illustrated in FIG. 9 includes a first cord 110 having a plug, 111 connectable to an outlet P provided on the wall surface (or the external wall surface) of a building (e.g., a house), a second cord 120 having a connector 121 connectable to an inlet provided in a motor vehicle C, and a circuit breaker 130 for interconnecting the first cord 110, and the second cord 120 in such a manner as to break the electric path between the first cord 110 and the second cord 120 at the occurrence of electric leakage.

UL (Underwriters Laboratories Inc.) Standards require that the length of the first cord 110 extending between the outlet P and the circuit breaker 130 in the electric vehicle charging cord set 100 should be 10 cm to 30 cm. For that reason, a relatively long cord is used as the second cord 120 so that the outlet P and the motor vehicle C can be interconnected even if they are distant.

Therefore, it is often the case that, when the electric vehicle charging cord set 100 is use, the redundant extension of the second cord 120 lies on the ground surface. This is problematic in safety because a man may be tripped over the redundant extension of the second cord 120. Another problem is that the redundant extension of the second cord 120 lying on the ground surface is bad in outward appearance. Additionally, there is a problem in that it becomes difficult to transport and use the cord set if the second cord 120 is relatively long.

SUMMARY OF THE INVENTION

In view of the above, the present invention provides an electric vehicle charging cord set which is safe to use and good in outward appearance.

In accordance with a first embodiment of the invention, there is provided an electric vehicle charging cord set, including: a housing containing an interrupting device therein, the interrupting device provided with a pair of terminal units and adapted to disconnect the terminal units from each other at the occurrence of electric leakage; a first cord provided at one end with a plug connectable to an outlet installed on a wall surface of a building, the first cord being connected at the other end to one of the terminal units of the interrupting device; and a second cord provided at one end with a connector connectable to an inlet of an electric vehicle, the second cord being connected at the other end to the other of the terminal units of the interrupting device, wherein the housing includes a storage unit for extendibly storing the second cord, a stand for stably placing the housing on a ground surface and a transportation handle, and wherein the storage unit includes a drum rotatably attached to the housing for rotation about a rotational axis and provided with an outer circumferential surface, the second cord being wound on the outer circumferential surface of the drum along a plane perpendicular to the rotational axis.

With such configuration, the second cord can be pulled out by a desired length from the storage unit (in other words, the redundant extension of the second cord can stored in the storage unit). Therefore, there is no possibility that the redundant extension of the second cord lies on the ground surface. This makes it possible to prevent a man from being tripped over the redundant extension of the second cord. Thus, the cord set is safe to use and good in outward appearance. In addition, the cord set can be transported by gripping the handle and can be stably placed on the ground surface. Therefore, the cord set is easy and convenient to use.

In the cord set, the housing may include an attached portion to be attached to an attaching portion installed on the wall surface of the building.

With such configuration, the cord set can be attached, when in use, to the wall surface of a building if the length of the first cord does not allow the cord set to be placed on the ground surface.

In the cord set, the storage unit may include a driving device for rotating the drum in a direction in which the second cord is rewound.

With such configuration, the second cord can be automatically rewound by operating the driving device. This eliminates the need to manually rewind the second cord and makes it easy to perform the rewinding operation, thereby enhancing the convenience in use.

In the cord set, the housing may be provided with a holder portion for holding the connector in place.

With such configuration, the connector can be held in the housing. This makes it possible to prevent disconnection of the second cord which may occur when the connector would otherwise be hung down or infiltration of water or like other problems which may occur when the connector would otherwise be left alone on the ground surface.

The cord set may further include a temperature sensor for detecting the temperature of the second cord stored in the storage unit, and wherein the interrupting device serves to disconnect the terminal units from each other if the temperature of the second cord detected by the temperature sensor is equal to or greater than a predetermined temperature.

With such configuration, the terminal units are disconnected from each other and no electric current flows through the second cord if the temperature detected by the temperature sensor is equal to or greater than a predetermined temperature. This eliminates the possibility that the temperature of the second cord grows unduly high and the insulating sheath of the second cord is melted down to eventually expose the conductive wires.

In accordance with a second embodiment of the invention, there is provided an electric vehicle charging cord set, including: a plug removably connectable to an outlet supplied with a commercial electric power; a plurality of vehicle-couplable connectors each removably connectable to a connector of an electric vehicle to feed a charging current therethrough to a battery of the electric vehicle; a selector unit to which the vehicle-couplable connectors and the plug are connected through a charging cable, the selector unit being designed to select one of the vehicle-couplable connectors and to allow the charging current to be fed through the selected vehicle-couplable connector; and a rewinding unit for rewinding the charging cable.

With such configuration, it is possible to adjust the length of the charging cable pulled out when in use. This enhances the convenience in use. At the end of use, the charging cable can be rewound by the rewinding unit. This improves the ease of storage.

The present invention offers an advantageous effect that the cord set is safe to use and good in outward appearance.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

First Embodiment

Figure 9:
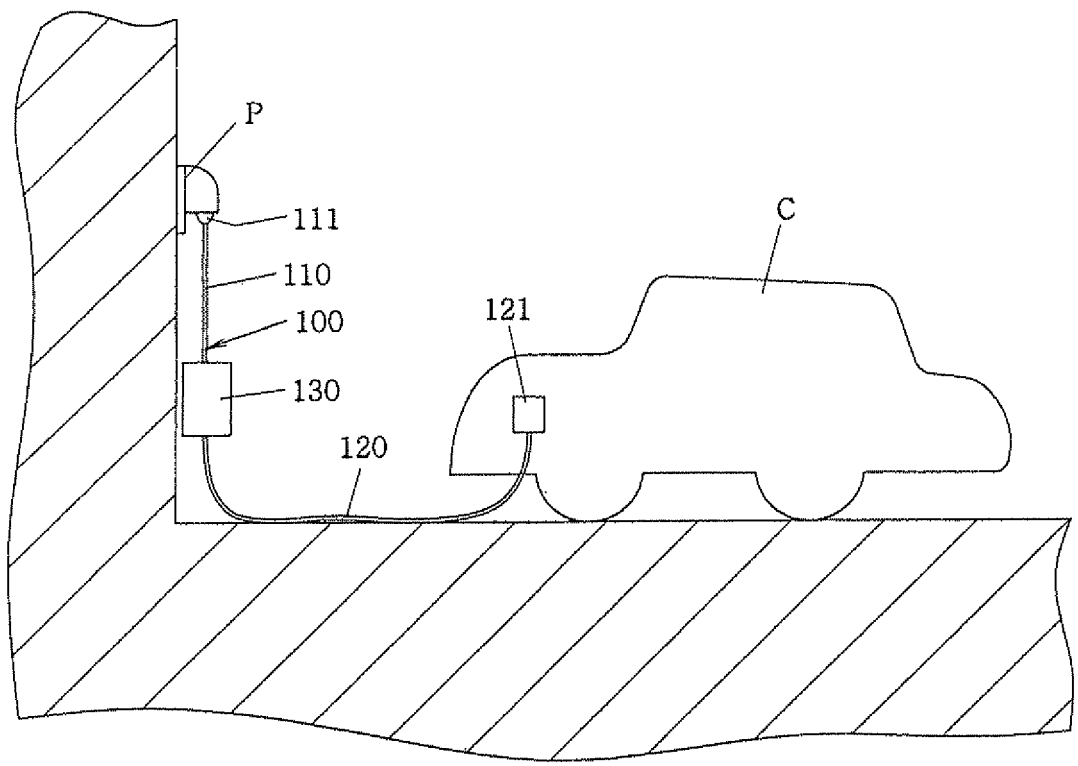
FIG. 9 is a view for explaining a prior art example.

The electric vehicle charging cord set (hereinafter abbreviated as "cord set") 1 in accordance with a first embodiment of the present invention refers to a power supply cord set for use in interconnecting an alternating current outlet P (see FIG. 9) installed on the wall surface (or the external wall surface) of a building (e.g., a housing) and an inlet (not shown) of an electric vehicle C (see FIG. 9). The term "electric vehicle" used herein means a motor vehicle equipped with a battery (or a secondary battery) and an electric motor, and are intended to cover a so-called hybrid car and a plug-in hybrid car equipped with an internal combustion engine (e.g., a gasoline engine) and an electric motor.

The inlet of the electric vehicle C has a suitable shape and structure depending on the standard requirements of the battery mounted to the electric vehicle C. In the present embodiment, the inlet is of the type corresponding to an alternating current, on the premise that the electric vehicle C is equipped with a charging device (not shown) for charging the battery by converting an alternating current to a direct current. In other words, the inlet of the electric vehicle C is connectable to an alternating current source (e.g., a commercial power source of AC 200 V with a frequency of 50 Hz or 60 Hz) and is provided with a pair of terminals (not shown) connected to a pair of voltage electrodes of the alternating current source and a terminal (not shown) serving as a grounding electrode. On the other hand, the outlet P is of the type corresponding to, e.g., an alternating current, and is provided with a pair of voltage-electrode prong rests (not shown) and a grounding-electrode prong rest (not shown). The outlet P of this type is well-known in the art and, therefore, will be omitted from detailed description.

Figure 2:
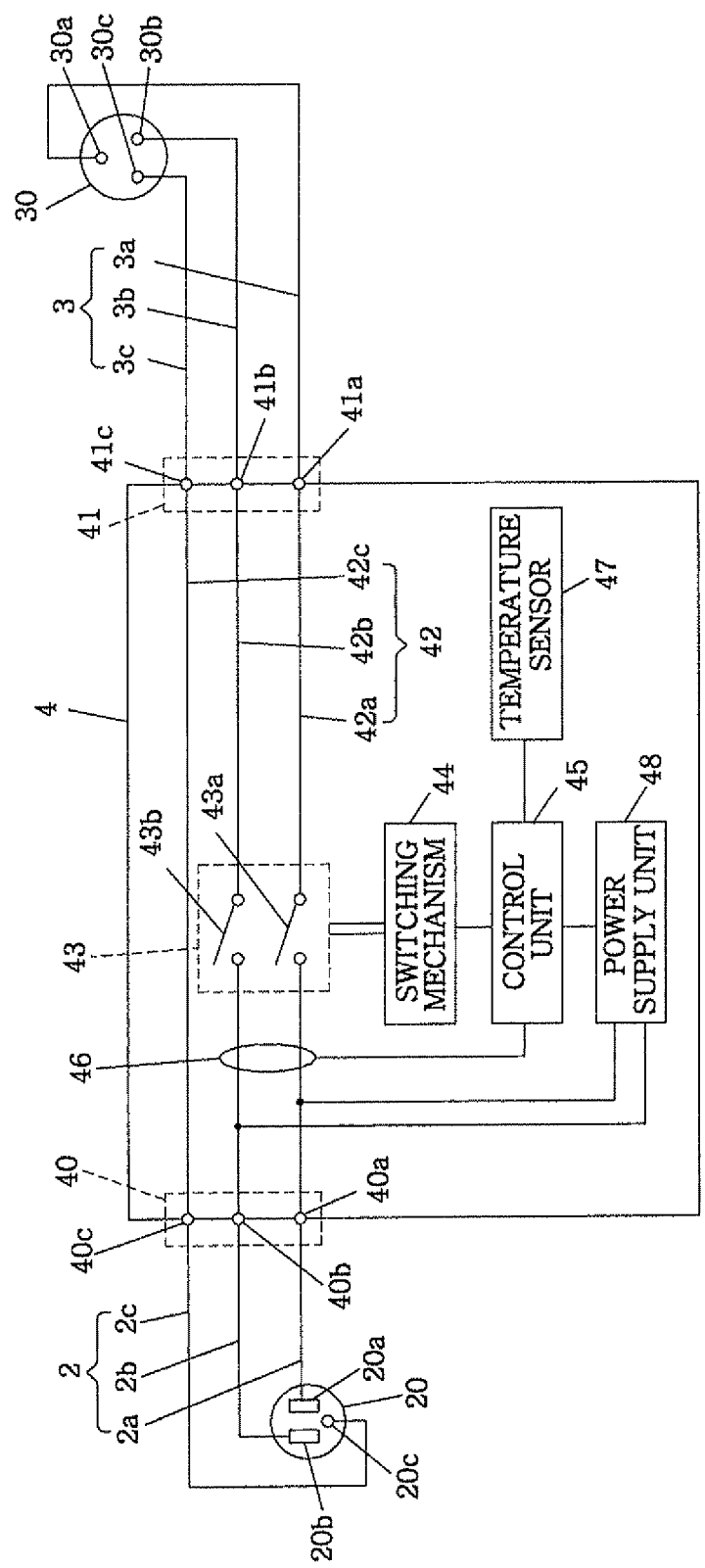
FIG. 2 is a circuit diagram of the electric vehicle charging cord set.

Referring to FIG. 2, the cord set 1 includes a first cord 2 for connection with a power source, a second cord 3 for connection with a load and an interrupting device 4 interposed between the first and second cords 2 and 3.

The first cord 2 is of a three-core type including one insulating tube (not shown) and three insulating sheath wires 2a, 2b and 2c arranged inside the insulating tube. The insulating sheath wires 2a and 2b are used for connection with the voltage electrodes and the insulating sheath wire 2c is used for connection with the grounding electrode. The first cord 2 is provided with a plug 20 at one end thereof. The plug 20 is used for connection with the outlet P and is provided with a pair of prongs 20a and 20b connectable to the voltage-electrode prong rests of the outlet P and a prong 20c connectable to the grounding-electrode prong rest. The three prongs 20a, 20b and 20c of the plug 20 are connected to one ends of the three insulating sheath wires 2a, 2b and 2c of the first cord 2. The plug 20 of this type is well-known in the art and, therefore, will be omitted from detailed description.

Just like the first cord 2, the second cord 3 is of a three-core type including one insulating tube (not shown) and three insulating sheath wires 3a, 3b and 3c arranged inside the insulating tube. The insulating sheath wires 3a and 3b are used for connection with the voltage electrodes and the insulating sheath wire 3c is used for connection with the grounding electrode. The second cord 3 is provided with a connector 30 at one end thereof. The connector 30 is used for connection with the inlet of the electric vehicle C and is provided with a pair of terminals 30a and 30b connectable to the voltage-electrode terminals of the inlet and a terminal 30c connectable to the grounding-electrode terminal of the inlet. The three terminals 30a, 30b and 30c of the connector 30 are respectively connected to one ends of the three insulating sheath wires 3a, 3b and 3c of the second cord 3.

The interrupting device 4 serves as a circuit breaker and is provided with a pair of terminal units 40 and 41. The terminal unit 40 includes three terminals 40a, 40b and 40c connected respectively to the other ends of the three insulating sheath wires 2a, 2b and 2c of the first cord 2. The terminal unit 40 is used as a power source connecting terminal unit for connection with an alternating current source. On the other hand, the terminal unit 41 includes three terminals 41a, 41b and 41c connected respectively to the other ends of the three insulating sheath wires 3a, 3b and 3c of the second cord 3. The terminal unit 41 is used as a load connecting terminal unit for connection with a load, i.e., the electric vehicle C.

The terminal units 40 and 41 are electrically connected to each other by an electric connection unit 42. The electric connection unit 42 includes an electric path 42a for interconnecting the terminals 40a and 41a, an electric path 42b for interconnecting the terminals 40b and 41b, and an electric path 42c for interconnecting the terminals 40c and 41c. In the electric connection unit 42, the electric paths 42a and 42b are used for power-feeding purposes and are provided with contact point units 43a and 43b. Each of the contact point units 43a and 43b is formed of mechanical points including a fixed contact point and a movable contact point coming into contact with or out of contact with the fixed contact point. These contact point units 43a and 43b constitute a switching unit 43 for switching on and off the electric current fed to the electric vehicle C. More specifically, if the switching unit 43 is closed (namely, if the contact point units 43a and 43b are all closed), an electric current can be fed to the electric vehicle C through the power-feeding electric paths 42a and 42b. If the switching unit 43 is open (namely, if the contact point units 43a and 43b are all open), the power-feeding electric paths 42a and 42b are cut off so that no electric current can be fed to the electric vehicle C.

The interrupting device 4 includes a switching mechanism 44 for causing the switching unit 43 to perform its switching operation and a control unit 45 for controlling the switching mechanism 44.

The switching mechanism 44 includes various kinds of mechanically coupled members, e.g., a fixed terminal plate to which the fixed contact points of the contact point units 43a and 43b of the switching unit 43 are fixedly secured, a movable contact member to which the movable contact points are fixedly secured, a spring member and a stopper. The switching mechanism 44 causes the switching operation of the switching unit 43 in response to the control signal supplied from the control unit 45. The switching mechanism 44 of this kind is well-known in the art and could take them. Therefore detailed description of that will be omitted.

The control unit 45 may be, e.g., a microcomputer or microcontroller (abbreviated as "micom" and referred to as "CPU" in a broad sense) and performs various kinds of processing to be described below by allowing a CPU to execute the program stored in a memory. The control unit 45 performs the processing of determining occurrence or absence of electric leakage based on the detection output of a residual current transformer 46 for detecting whether unbalanced currents exist in the powder-feeding electric paths 42a and 42b. If the results of such processing indicate occurrence of electric leakage, the control unit 45 controls the switching mechanism 44 in such a way as to bring the switching unit 43 into an open state. Thus, the terminal units 40 and 41 are disconnected from each other so that no electric current can be fed from the alternating current source to the electric vehicle C. In contrast, if the results of such processing indicate absence of electric leakage, the control unit 45 controls the switching mechanism 44 in such a way as to bring the switching unit 43 into a closed state, thereby allowing an electric current to be fed from the alternating current source to the electric vehicle C.

In addition, the control unit 45 performs the processing of controlling the switching mechanism 44 based on the detection results of a temperature sensor 47 for detecting the temperature of the second cord 3 stored in a storage unit 6 (or the ambient temperature rather than the temperature of the second cord 3 per se). If the temperature detected by the temperature sensor 47 in the above processing is equal to or greater than a predetermined temperature, the control unit 45 controls the switching mechanism 44 in such a way as to bring the switching unit 43 into an open state. Thus, the terminal units 40 and 41 are disconnected from each other so that no electric current can be fed from the alternating current source to the electric vehicle C. In contrast, if the detected temperature is smaller than the predetermined temperature, the control unit 45 controls the switching mechanism 44 in such a way as to bring the switching unit 43 into a closed state, thereby allowing an electric current to be fed from the alternating current source to the electric vehicle C. In this regard, the predetermined temperature is set on the basis of the melting point of a material of which the insulating sheaths of the insulating sheath wires of the second cord 3 are made or the melting point of a material (e.g., vinyl or the like) of which the insulating tube is made. More specifically, the predetermined temperature is set to ensure that the electric paths 42a and 42b are disconnected before the insulating sheaths and the insulating tube begin to be melted.

As set forth above, the interrupting device 4 has a function of disconnecting the terminal units 40 and 41 from each other and stopping the feeding of an electric current at the occurrence of electric leakage and a function of disconnecting the terminal units 40 and 41 from each other and stopping the feeding of an electric current when the insulating sheaths and the insulating tube of the second cord 3 are likely to be melted.

The interrupting device 4 further includes a power supply unit 48 for supplying an electric current required in operating the control unit 45. The power supply unit 48 includes a regulator and so forth. Each of input terminals (not shown) of the power supply unit 48 connected to the electric paths 42a and 42b between the terminals 40a and 40b and the contact point units 43a and 43b. This makes sure that the power supply unit 48 can be supplied with an electric current even if the contact point units 43a and 43b are kept open.

Figure 1A:
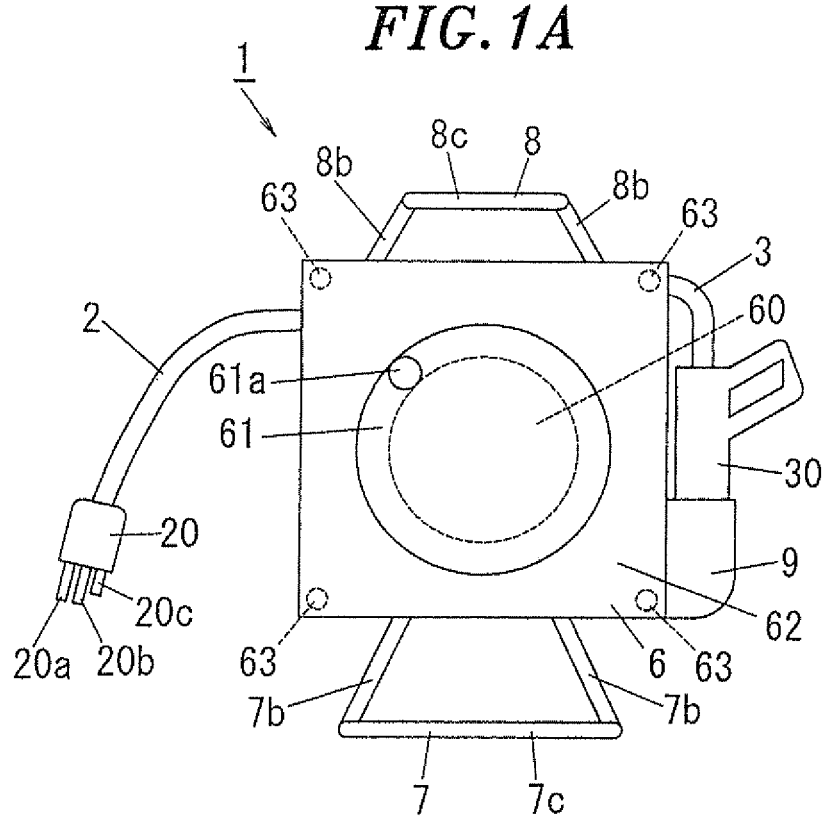
FIGS. 1A and 1B are front and side views showing an electric vehicle charging cord set in accordance with a first embodiment of the present invention.
Figure 1B:
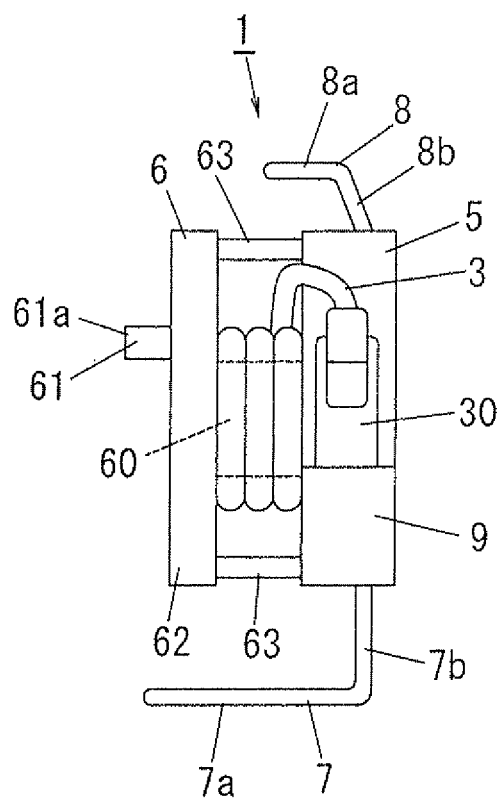

The interrupting device 4 is stored within a housing 5 as shown in FIGS. 1A and 1B. For the sake of simplicity in description, the vertical direction in FIG. 1A will be hereinafter referred to as the height direction of the housing 5, the transverse direction in FIG. 1A as the width direction of the housing 5, and the direction normal to the paper surface in FIG. 1A as the thickness direction of the housing 5.

The housing 5 is formed into the shape of a rectangular box, the height direction and width direction dimensions of which are substantially identical with each other and the thickness direction dimension of which is smaller than the height direction dimension. On one width direction side surface of the housing 5 (namely, on the left surface of the housing 5 in FIG. 1A), there is formed a first opening portion (not shown) through which to pass the first cord 2. In other words, one end of the first cord 2 is pulled out to the outside through the first opening portion, while the other end of the first cord 2 is connected to the terminal unit 40 of the interrupting device 4 within the housing 5. UL (Underwriters Laboratories Inc.) Standards require that the length of the first cord 2 extending between the outlet P and the interrupting device 4 as a circuit breaker should be 10 cm to 30 cm. Thus, the length of the first cord 2 is set to, fall within this range.

On one thickness direction side surface of the housing 5 (namely, on the left surface of the housing 5 in FIG. 1B), there is provided a storage unit 6 for extendibly storing the second cord 3.

The storage unit 6 includes a drum 60 on which the second cord 3 is wound. The drum 60 is formed into a tubular shape with a truly circular cross section and is attached to one thickness direction side surface of the housing 5 for rotation about the central axis thereof extending in the thickness direction of the housing 5. A precisely circular disk portion 61 is provided on the opposite side of the drum 60 from the housing 5 (namely, on the left side of the drum 60 in FIG. 18). The disk portion and the drum 60 are concentrically aligned with each other. A knob 61*a* for use in manually rotating the drum 60 protrudes from the edge of the opposite surface of the disk portion 61 from the drum 60 (namely, the left surface of the disk portion 61 in FIG. 18). The disk portion 61 is rotatably held inside a frame portion 62 having a circular inner circumference (a little greater than the outer circumference of the disk portion 61) and a rectangular outer circumference. The contour size of the frame portion 62 is the same as the size of one thickness direction surface of the housing 5. The frame portion 62 is attached to the housing 5 by connector portions 63 of rod shape (i.e., circular rod shape in the illustrated example). The connector portions 63 are four in number and are positioned in four corners of the frame portion 62.

On one thickness direction surface of the housing 5, there is formed a second opening portion (not shown) through which to pass the second cord 3. One end portion of the second cord 3 is pulled out toward the storage unit 6 through the second opening portion. The other end of the second cord 3 is connected to the terminal unit 41 of the interrupting device 4 within the housing 5, whereby the second cord 3 is connected to the first cord 2 through the interrupting device 4. The second cord 3 pulled out from the housing 5 is wound on the outer circumferential surface of the drum 60 (namely, on the outer circumferential surface of the drum 60 along the plane perpendicular to the rotational axis). This makes it possible to adjust the length of the second cord 3 that can be pulled out from the storage unit 6 as the drum 60 rotates.

A stand 7 as a prop for use in stably placing the housing 5 on the ground surface is provided on one height direction surface of the housing 5 (on the lower surface of the housing 5 in FIG. 1A). The stand 7 is made of, e.g., metal, and includes a pair of foot portions 7*a* extending in the thickness direction of the housing 5 and spaced apart by a specified distance from each other in the width direction of the housing 5, a pair of leg portions 7*b* for connecting one ends of the foot portions 7*a* (i.e., the ends closer to the housing 5) to one height direction surface of the housing 5, and a bridge portion 7*c* for interconnecting the other ends of the foot portions 7*a* (i.e., the ends closer to the storage unit 6). The foot portions 7*a*, the leg portions 7*b* and the bridge portion 7*c* are formed into a single piece. The stand 7 may be of any suitable type adopted in view of the position of gravity center of the cord set 1.

There is provided a transportation handle 8 on the other height direction surface of the housing 5 (namely, on the upper surface of the housing 5 in FIG. 1A). The handle 8 is made of, e.g., metal, and includes a pair of side portions 8*a* extending in the thickness direction of the housing 5 as a longitudinal direction and spaced apart by a specified distance from each other in the width direction of the housing 5, a pair of connector portions 8*b* for respectively connecting one ends of the side portions 8*a* (i.e., the ends closer to the housing 5) to the other height direction surface of the housing 5, and a grip portion 8*c* for interconnecting the other ends of the side portions 8*a* (i.e., the ends closer to the storage unit 6). The side portions 8*a*, the connector portions 8*b* and the grip portion 8*c* are formed into a single piece. In view of the ease of transportation and the position of gravity center of the cord set 1, the handle 8 is designed to ensure that the height direction of the housing 5 coincides with the vertical direction during transportation of the cord set 1.

A holder portion 9 is provided on the other width direction surface of the housing 5 (namely, on the right surface of the housing 5 in FIG. 1A) and is positioned nearer to one height direction surface of the housing 5 (namely, the lower surface of the housing 5 in FIG. 1A). The holder portion 9 is used to hold the connector 30 in place and is formed into the shape of a box opened toward the other height direction surface of the housing 5 (namely, toward the upper surface of the housing 5 in FIG. 1B). The connector 30 is held within the holder portion 9 in a state that the tip end portion thereof is inserted into the holder portion 9 through the opening of the latter. The shape of the holder portion 9 is not limited to the example set forth above. The holder portion 9 may have any other shape insofar as it can keep the tip end of the connector 30 spaced apart from the ground surface.

As stated above, the cord set 1 includes: the housing 5 that contains therein the interrupting device 4 provided with the terminal units 40 and 41 and adapted to disconnect the terminal units 40 and 41 from each other at the occurrence of electric leakage; the first cord 2 provided at one end with the plug 20 connectable to the outlet P installed on the wall surface of a building and connected at the other end to the terminal unit 40 of the interrupting device 4; and the second cord 3 provided at one end with the connector 30 connectable to the inlet of the electric vehicle C and connected at the other end to the terminal unit 41 of the interrupting device 4. Provided in the housing 5 of the cord set 1 are: the storage unit 6 for extendibly storing the second cord 3; the stand 7 as a prop for stably placing the housing 5 on the ground surface; and the transportation handle 8. The storage unit 6 includes the drum 60 rotatably attached to the housing 5 and provided with the outer circumferential surface on which the second cord 3 is wound along the plane perpendicular to the rotational axis.

When in use, the cord set 1 of the present embodiment is transported to a desired position by gripping the handle 8 and is placed in the desired position using the stand 7. Then, the plug 20 of the first cord 2 is connected to the outlet P, and the connector 30 is connected to the inlet of the electric vehicle C. When connecting the connector 30 to the inlet of the electric vehicle C, the connector 30 is removed from the holder portion 9, and the second cord 3 is pulled out by a desired length from the storage unit 6. In case where the second cord 3 is excessively pulled out, the drum 60 is rotated with the knob 61*a* in such a direction as to rewind the second cord 3, thereby allowing the redundant extension of the second cord 3 to be retracted into the storage unit 6.

With the cord set 1 of the present embodiment, the second cord 3 can be pulled out by a desired length from the storage unit 6 (in other words, the redundant extension of the second cord 3 can be stored within the storage unit 6). Therefore, there is no possibility that the redundant extension of the second cord 3 lies on the ground surface. This makes it possible to prevent a man from being tripped over the redundant extension of the second cord 3. Thus, the cord set 1 is safe to use and good in outward appearance. In addition, the cord set 1 can be transported by gripping the handle 8 and can be stably placed on the ground surface using the stand 7. Therefore, the cord set 1 is easy and convenient to use. In particular, the cord set 1 is easy to transport because the second cord 3 can be stored within the storage unit 6.

Since the housing 5 is provided with the holder portion 9 for holding the connector 30, it is possible for the housing 5 to hold the connector 30 in place. This makes it possible to prevent disconnection of the second cord 3 which may occur when the connector 30 would otherwise be hung down or infiltration of water or like other problems which may occur when the connector 30 would otherwise be left alone on the ground surface.

The cord set 1 further includes the temperature sensor 47 for detecting the temperature of the second cord 3 stored in the storage unit 6. The interrupting device 4 has the function of disconnecting the terminal units 40 and 41 from each other if the temperature detected by the temperature sensor 47 is equal to or greater than a predetermined temperature. Therefore, when the detected temperature is equal to or greater than, the predetermined temperature, the terminal units 40 and 41 are disconnected from each other and no electric current flows through the second cord 3. This eliminates the possibility that the temperature of the second cord 3 grows unduly high and the insulating sheath of the second cord 3 is melted down to eventually expose the conductive wires.

In the meantime, the length of the first cord 2 is regulated by UL Standards. In case where the outlet P is situated in a relatively high location, the cord set 1 cannot be placed on the ground surface, which may lead to a situation that the housing 5 and the storage unit 6 are suspended from the first cord 2. Thus, a heavy load is applied to the first cord 2 and the outlet P, which may possibly result in severance of the first cord 2 or destruction of the plug 20.

Figure 3A:
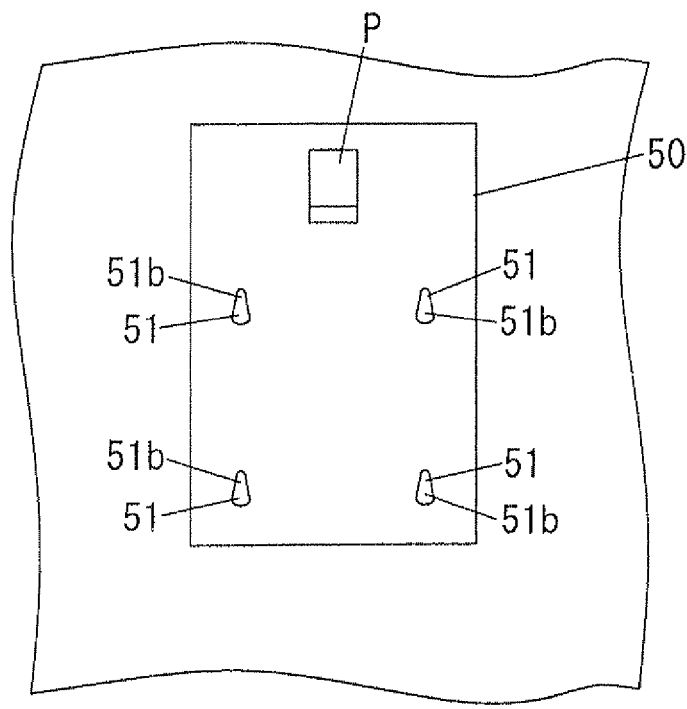
FIGS. 3A and 3B are front and side views showing an attachment portion to which the electric vehicle charging cord set is attached.
Figure 3B:
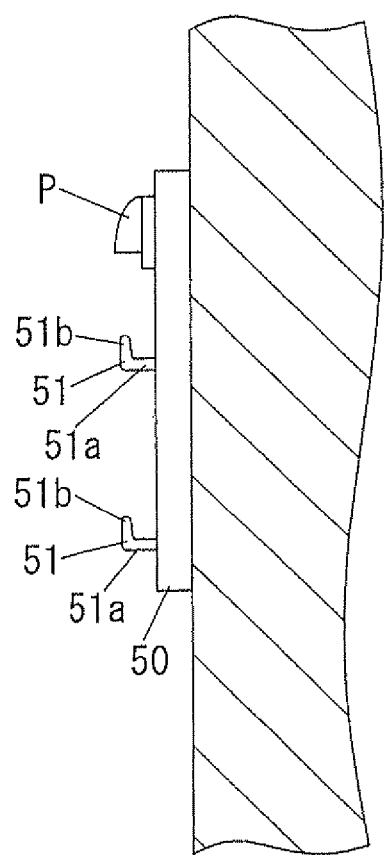

Taking this into account, the housing 5 is configured so that it can be attached to an attachment plate 50 as shown in FIGS. 3A and 3B. The attachment plate 50 is used as an attachment unit for attaching the housing 5 to a wall surface and is formed into a flat rectangular shape. In one longitudinal end portion of the attachment plate 50 (namely, in the upper end portion of the attachment plate 50 in FIG. 3A), there are formed a through-hole (not shown) through which to insert an attachment screw (not shown) for fixing the outlet P to the wall surface and an opening (not shown) through which to connect the electric wires of an alternating current source to the outlet P. As can be seen in FIGS. 3A and 3B, the attachment plate 50 is attach to the wall surface in such a fashion that it is positioned between the outlet P and the wall surface.

On the opposite surface of the attachment plate 50 from the wall surface (namely, on the left surface of the attachment plate 50 in FIG. 3B), there are provided a plurality of (e.g., four) hook portions 51. The hook portions 51 are all positioned between the area in which the outlet P is arranged and the other longitudinal end portion of the attachment plate 50 (namely, the lower end portion of the attachment plate 50 in FIG. 3A). Each of the hook portions 51 has an L-shaped cross section and includes a protrusion portion 51a protruding from the opposite surface of the attachment plate 50 and a claw portion 51b extending from the tip end of the protrusion portion 51a toward one longitudinal end portion of the attachment plate 50. The hook portions 51 are arranged in a corresponding relationship with the four corners of the housing 5.

Figure 4A:
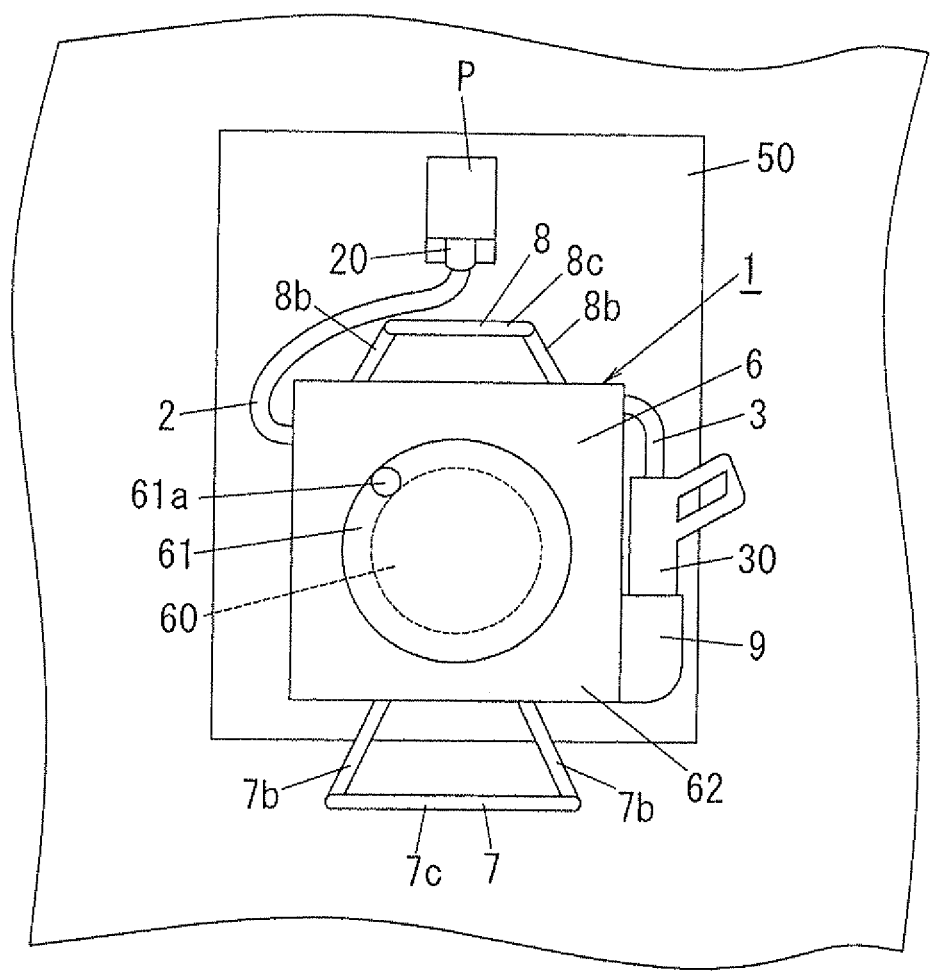
FIGS. 4A and 4B are front and side views showing the electric vehicle charging cord set attached to the attachment portion.
Figure 4B:
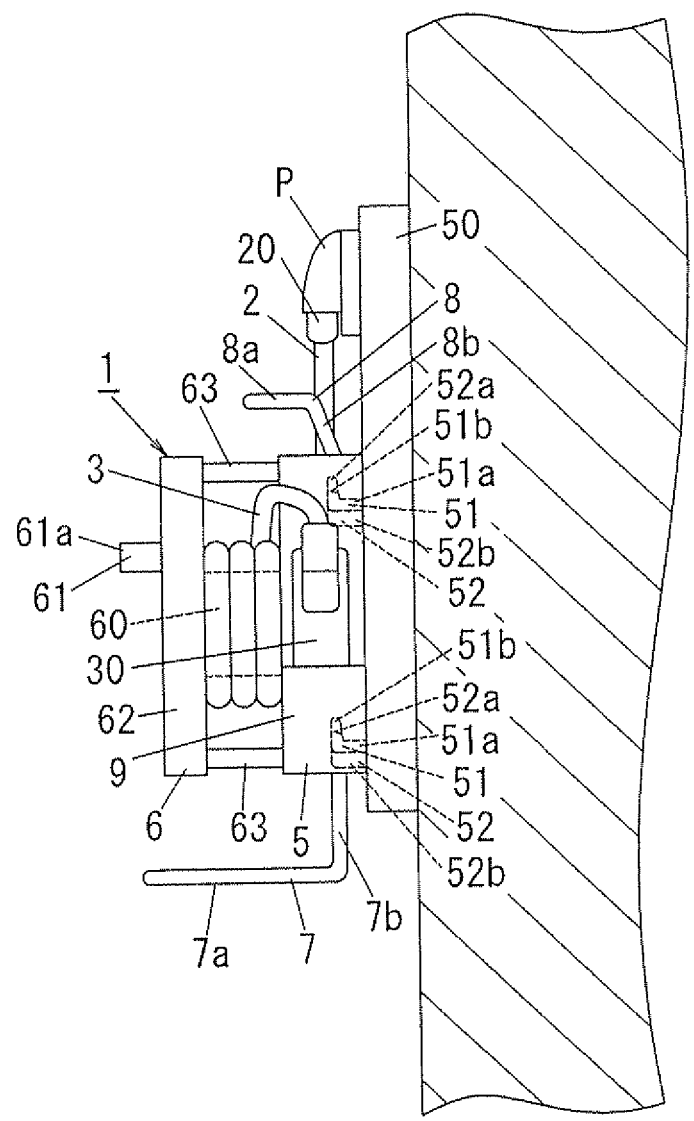

In the four corners of the other thickness direction surface of the housing 5, there are formed hook holes 52 into which the hook portions 51 are inserted (see FIG. 4B). Each of the hook holes 52 has an L-shaped cross section and includes an engagement recess portion 52a for male-and-female engagement with the tip end portion of the claw portion 51b and an introduction portion 52b through which to introduce the claw portion 51b into the engagement recess portion 52a (see FIG. 4B).

As shown in FIGS. 4A and 4B, the cord set 1 is attached to the attachment plate 50 by putting the hook portions 51 into the four hook holes 52 and then inserting the claw portions 51b of the hook portions 51 into the engagement recess portions 52a of the hook holes 52. Therefore, the hook holes 52 constitute an attached portion by which the housing 5 is attached to the attachment plate as an attaching portion provided on the wall surface having the outlet P.

By attaching the housing 5 to the attachment plate 50 in this manner, it becomes possible to attach the cord set 1 to the wall surface of a building even though the length of the first cord 2 does not allow the cord set 1 to be placed on the ground surface. In addition, it is possible to prevent exertion of a heavy load on the first cord 2 or the plug 20 and resultant destruction of the latter.

Figure 5:
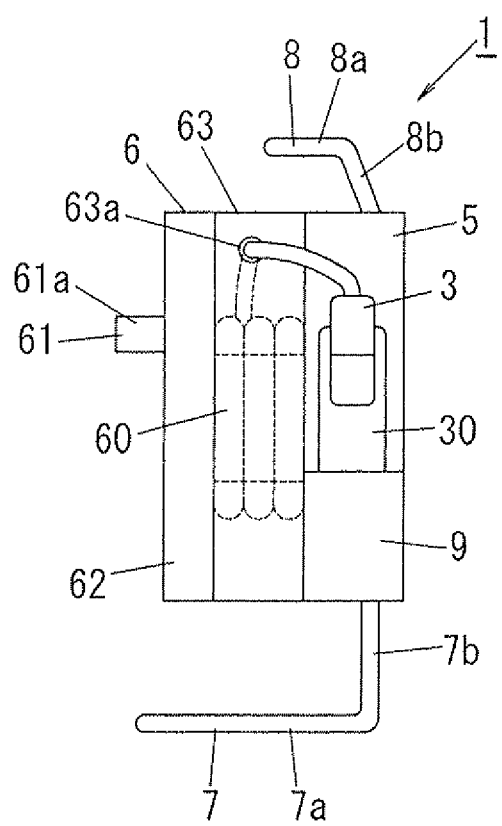
FIG. 5 is a side view showing a modified example of the electric vehicle charging cord set shown in FIGS. 1A and 1S.

Although the connector portions 63 of the storage unit 6 have a rod-like shape in the preceding example, it may be possible to employ, as shown in FIG. 5, a rectangular frame type connector portion 63 that surrounds the second cord 3 wound on the drum 60. The connector portion 63 shown in FIG. 5 is configured to interconnect the frame portion 62 and the housing 5 in such a fashion that the respective side surfaces of the housing 5 remain flush with the respective side surfaces of the frame portion 62. On the surface of the connector portion 63 adjacent to the other width direction end surface of the housing 5, there is formed a cord insertion hole 63a through which the second cord 3 is stored in the storage unit 6. Use of the connector portion 63 makes it possible to hide the redundant extension of the second cord 3 (i.e., the extension of the second cord 3 wound on the drum 60). Thus, the cord set 1 looks smart and has a good appearance.

With the storage unit 6 set forth above, the rewinding operation of the second cord 3 is carried out by manually rotating the drum 60. The storage unit 6 is not limited to this example but may be provided with, e.g., a driving device (not shown) for rotating the drum 60 in the direction in which the second cord 3 is rewound. Provision of the driving device makes it possible to automatically rewind the second cord 3 by merely operating the driving device. This eliminates the need to manually rewind the second cord 3, which enhances the ease of rewinding operation and the convenience in use.

The first embodiment and its modified examples described above have been presented for illustrative purposes only and are not intended to limit the scope of the invention. Modifications, and changes may be made without departing from the scope of the invention defined in the claims. For example, a storage unit for extendibly storing the first cord 2 may be provided in addition to the storage unit 6 for storing the second cord 3. This makes it possible to adjust the length of the first cord 2. According to UL Standards, the length of the first cord 2 can be adjusted within the range of from 10 cm to 30 cm. In addition, it is not always necessary to form the housing 5 into a rectangular shape. Moreover, the shape of the stand 7 and the handle 8 shall not be limited to the illustrated example.

Second Embodiment

Figure 6:
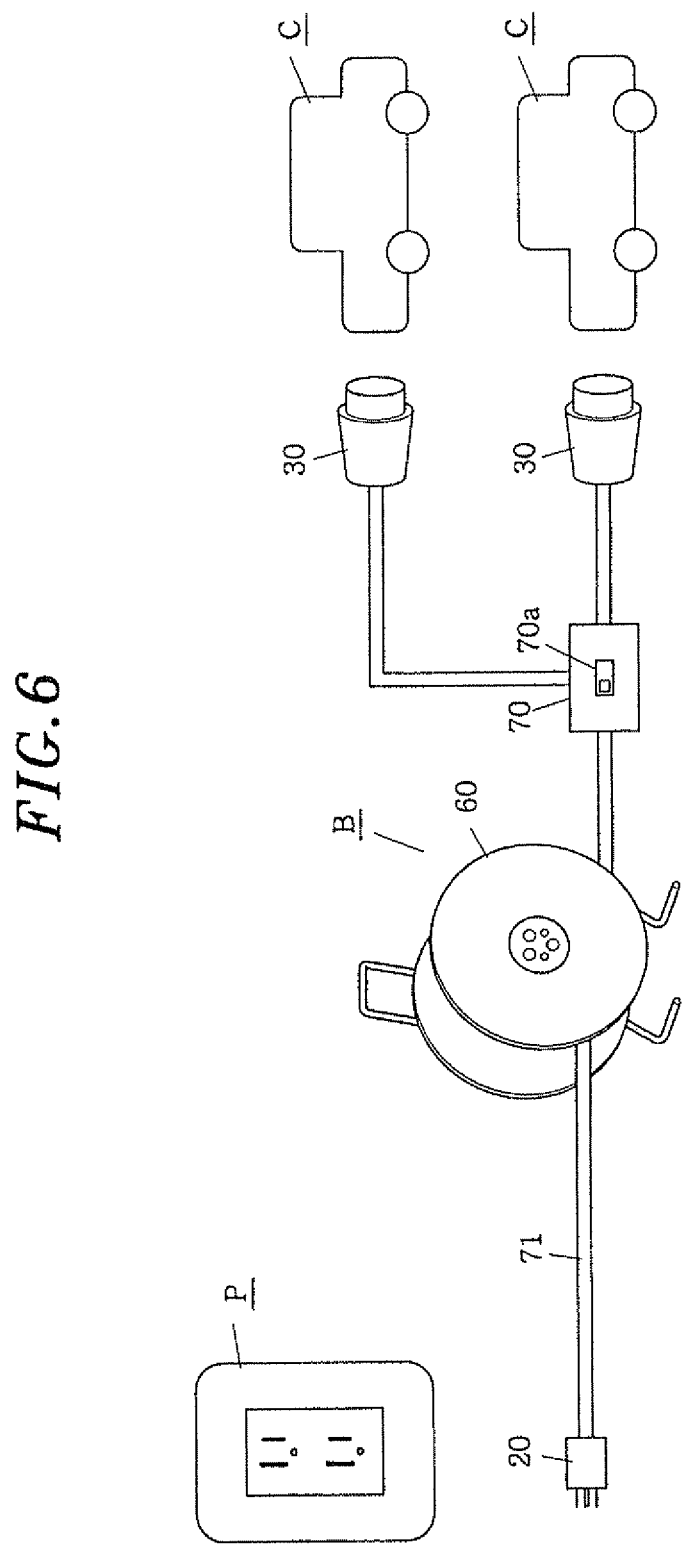
FIG. 6 is a schematic system diagram showing an electric vehicle charging cord set in accordance with a second embodiment of the present invention.

FIG. 6 is a schematic system diagram showing an electric vehicle charging cord set B in accordance with a second embodiment of the present invention. The electric vehicle charging cord set B of the present embodiment includes a plug 20 removably connectable to an outlet P of commercial power source, a plurality of (two, in the present embodiment) vehicle-couplable connectors 30 removably connected to the connectors of electric vehicles C, a changeover device (or a selector unit) 70 for selecting one of the vehicle-couplable connectors 30 to be supplied with an electric current, and a rewinding drum (or a rewinding unit), 60 on which a charging cable 71 is wound. The vehicle-couplable connectors 30 and the plug 20 are connected to the changeover device 70 through the charging cable 71. The changeover device 70 includes a changeover switch 70a that, when operated, causes a contact point unit to be changed over toward one of the vehicle-couplable connectors 30.

With the present embodiment, it is possible to adjust the length of the charging cable 71 pulled out when in use, which enhances the convenience in use. At the end of use, the charging cable 71 can be rewound on the rewinding drum 60, which improves the ease of storage.

Figure 7:
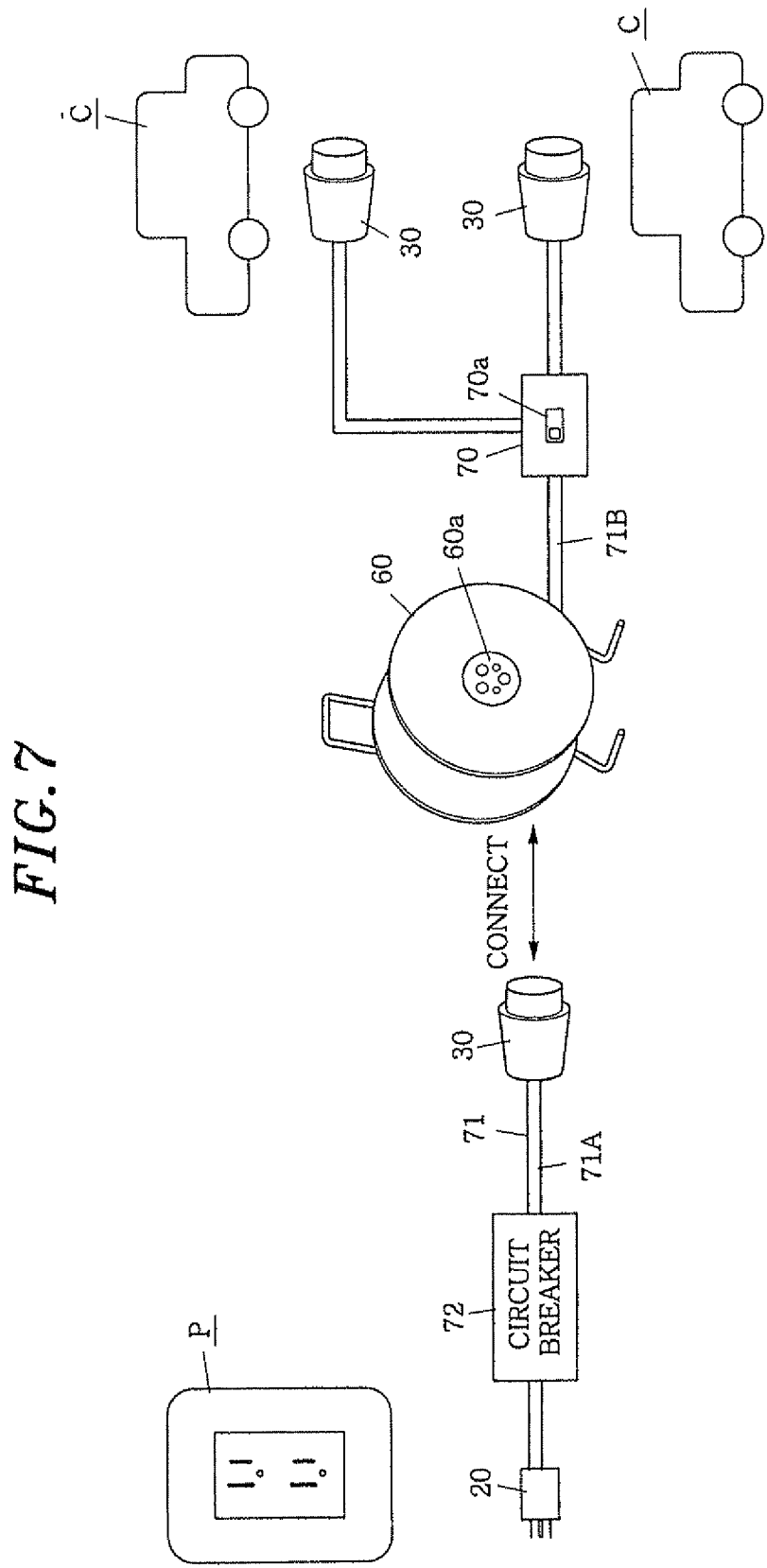
FIG. 7 is a schematic system diagram showing modified example of the electric vehicle charging cord set shown in FIG. 6.

Although the charging cable 71 is formed of a single cable in the present embodiment, it may be possible to employ, e.g., a charging cable 71B united with the rewinding drum 60 and a charging cable 71A connectable to a connector 60a provided on one surface of the rewinding drum 60 through a vehicle-couplable connector 30, as shown in FIG. 7. A circuit breaker 72 is provided in the charging cable 71A between the plug 20 and the vehicle-couplable connector 30. In this case, it is equally possible to adjust the length of the charging cable 1B pulled out when in use, which enhances the convenience in use. At the end of use, the charging cable 1B can be rewound on the rewinding drum 60, which improves the ease of storage. Although the changeover device 70 employed in the present embodiment is manually operable with the changeover switch 70a, it may be possible to use an automatically operable changeover device.

Third Embodiment

An electric vehicle charging cord set B in accordance with a third embodiment of the present invention will now be described with reference to FIG. 8. In case where electric leakage is detected, the respective changeover contact switches of a contact point unit 70b of the changeover device 70 are changed over so that the first cord 2 is not connected to any one of the vehicle-couplable connectors 30, thereby interrupting an electric current fed to all of the vehicle-couplable connectors 30. Other configurations are the same as the configurations of the second embodiment. The same constituent elements will be designated by like reference numerals and will be omitted from description.

Figure 8:
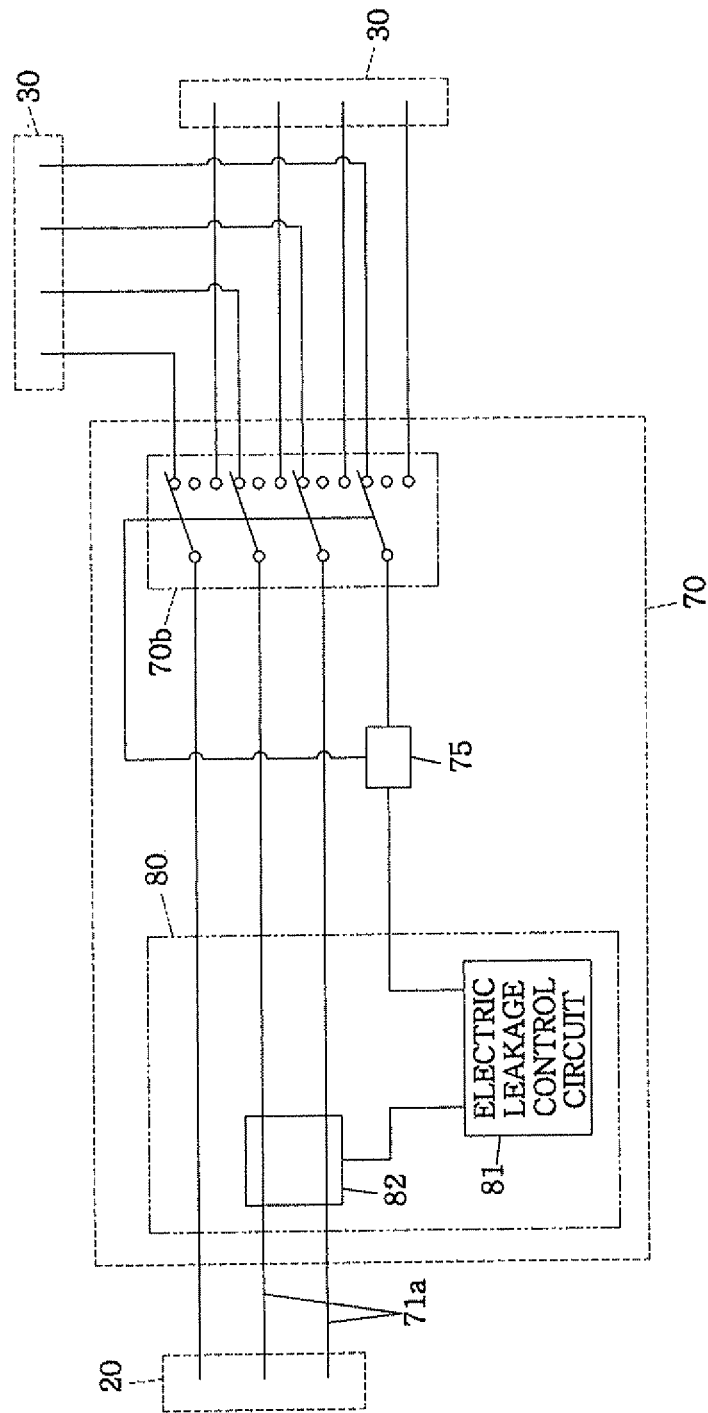
FIG. 8 is a circuit diagram showing a changeover device employed in an electric vehicle charging cord set in accordance with a third embodiment of the present invention.

As can be seen in FIG. 8, the changeover device 70 of the present embodiment includes a contact point unit 70b having a plurality of (four, in FIG. 8) changeover contact switches, an electric leakage detector unit 80 for detecting an electric current leaked from the charging cable 71, and a control unit 75 for changing over the contact point unit 70b in response to the charging completion signal supplied from the electric vehicles C or the leakage detection signal supplied from the electric leakage detector unit 80. The electric leakage detector unit 80 includes an electric leakage detector circuit 82 for detecting a leaked electric current flowing between the respective power lines 71a (through which electric power L and N is supplied) and the ground, and an electric leakage control circuit 81 for outputting a leakage detection signal to the control unit 75 according to the detection results of the electric leakage detector circuit 82.

As shown in FIG. 8, each of the changeover contact switches of the contact point unit 70b can be changed over to three points, two of which are connected to the vehicle-couplable connectors 30 and the remaining one of which remains disconnected. In other words, the changeover device 70 of the present embodiment can be changed over between a state in which an electric current is fed to a selected one of the vehicle-couplable connectors 30 and a state in which an electric current is not fed to any of the vehicle-couplable connectors 30. The changeover device 70 is designed to ensure that, if electric leakage is detected by the electric leakage detector unit 80, an electric current is not fed to any of the vehicle-couplable connectors 30 (that is to say, the changeover contact switches are changed over to the disconnected point).

By connecting the vehicle-couplable connectors 30 to the connectors of the respective electric vehicles C and putting the plug 20 into the outlet P, an electric current of a commercial power source is fed to one of the electric vehicles C through one of the vehicle-couplable connectors 30 selected by the control unit 75. Thus, the battery of one of the electric vehicles C is charged with an electric current. In an instance where the electric leakage detector circuit 82 of the electric leakage detector unit 80 detects electric leakage during the process of charging the electric vehicle C, the electric leakage detector circuit 82 outputs a leakage detection signal to the control unit 75. Responsive to the leakage detection signal, the control unit causes all of the changeover contact switches of the contact point unit 70b to be changed over to the disconnected points, thereby interrupting an electric current fed to the vehicle-couplable connectors 30.

With the present embodiment, if electric leakage is detected by the electric leakage detector unit 80, all of the changeover switches of the contact point unit 70b are changed over to the disconnected points, consequently interrupting an electric current fed to the vehicle-couplable connectors 30. This eliminates the need to provide a current-interrupting relay or other like components in the electric leakage detector unit 80, which assists in reducing the number of parts.

In the second and third embodiments described above, the cord set is provided with two vehicle-couplable connectors 30. However, the number of the vehicle-couplable connectors 30 is not limited to two but may be three or more. In the second and third embodiments described above, the signal lines through which to transmit the electric signals outputted from the electric vehicles C are provided independently of the power lines. Alternatively, the electric signals may be transmitted to the changeover device through the power lines by a power line carrier communication method.

While the invention has been shown and described with respect to the embodiments, it will be understood by those skilled in the art that various changes and modification may be made without departing from the scope of the invention as defined in the following claims.

What is claimed is:
1. An electric vehicle charging cord set, comprising:
a housing containing an interrupting device therein, the interrupting device being provided with a pair of terminal units and adapted to disconnect the terminal units from each other at the occurrence of electric leakage;
a first cord provided at one end with a plug connectable to an outlet installed on a wall surface of a building, the first cord being connected at the other end to one of the terminal units of the interrupting device; and
a second cord provided at one end with a connector connectable to an inlet of an electric vehicle, the second cord being connected at the other end to the other of the terminal units of the interrupting device,
wherein the housing includes a storage unit for extendibly storing the second cord, a stand for stably placing the housing on a ground surface and a transportation handle, and wherein the storage unit includes a drum rotatably attached to the housing for rotation about a rotational axis and provided with an outer circumferential surface, the second cord being wound on the outer circumferential surface of the drum along a plane perpendicular to the rotational axis,
wherein the interrupting device includes:
a switching mechanism configured to perform switching operation between the terminal units;
a control unit configured to control the switching mechanism; and
a power supply unit configured to supply a power to the control unit, wherein the housing is provided with a holder portion for holding the connector in place, wherein the holder portion includes a box-shaped holding part protruding from the housing, the holding part having flat rectangular surfaces and an opening on an upper surface of the holding part, and wherein the holder portion is configured such that the connector is held within the holder portion in a state that a tip end portion of the connector is inserted into the holder portion through the opening.

2. The cord set of claim 1, wherein the housing includes an attached portion to be attached to an attaching portion installed on the wall surface of the building.

3. The cord set of claim 1, wherein the storage unit includes a driving device for rotating the drum in a direction in which the second cord is rewound.

4. The cord set of claim 2, wherein the storage unit includes a driving device for rotating the drum in a direction in which the second cord is rewound.

5. The cord set of claim 1, further comprising a temperature sensor for detecting the temperature of the second cord stored in the storage unit, and wherein the control unit is configured to control the switching mechanism to disconnect the terminal units from each other if the temperature of the second cord detected by the temperature sensor is equal to or greater than a predetermined temperature.

6. The cord set of claim 2, further comprising a temperature sensor for detecting the temperature of the second cord stored in the storage unit, and wherein the control unit is configured to control the switching mechanism to disconnect the terminal units from each other if the temperature of the second cord detected by the temperature sensor is equal to or greater than a predetermined temperature.

7. The cord set of claim 3, further comprising a temperature sensor for detecting the temperature of the second cord stored in the storage unit, and wherein the control unit is configured to control the switching mechanism to disconnect the terminal units from each other if the temperature of the second cord detected by the temperature sensor is equal to or greater than a predetermined temperature.

8. The cord set of claim 4, further comprising a temperature sensor for detecting the temperature of the second cord stored in the storage unit, and wherein the control unit is configured to control the switching mechanism to disconnect the terminal units from each other if the temperature of the second cord detected by the temperature sensor is equal to or greater than a predetermined temperature.

9. An electric vehicle charging cord set, comprising:

a plug removably connectable to an outlet supplied with a commercial electric power;

a plurality of vehicle-couplable connectors each removably connectable to a connector of an electric vehicle to feed a charging current therethrough to a battery of the electric vehicle; and a selector unit to which the vehicle-couplable connectors and the plug are connected through a charging cable, the selector unit being configured to select one of the vehicle-couplable connectors and to allow the charging current to be fed to the selected vehicle-couplable connector, wherein the selector unit includes:

at least one changeover contact switch each being configured to connect the plug to one of at least three contact points including one dummy contact point connected to none of the vehicle-couplable connectors;

an electric leakage detector unit configured to detect an electric current leakage from the charging cable when the charging current is fed to the selected vehicle-couplable connector; and a control unit configured to control each changeover contact switch to connect the plug to the dummy contact point when the electric current leakage is detected by the electric leakage detector unit.

10. The cord set of claim 9, further comprising a rewinding unit for rewinding the charging cable.

* * * * *